United States Patent [19]
LeCong

[11] Patent Number: 5,191,614
[45] Date of Patent: Mar. 2, 1993

[54] SECURE COMMUNICATION SYSTEM

[75] Inventor: Phung LeCong, Buena Park, Calif.

[73] Assignee: McDonnell Douglas Corporation, Long Beach, Calif.

[21] Appl. No.: 274,368

[22] Filed: Nov. 14, 1988

[51] Int. Cl.$^5$ .............................................. H04L 9/18
[52] U.S. Cl. ........................................ 380/49; 380/9; 380/59; 359/118; 359/119; 359/154; 359/183
[58] Field of Search ............... 455/600, 605, 606, 607, 455/609–612, 615, 617–619, 601; 359/118, 119, 154, 183

[56] References Cited

U.S. PATENT DOCUMENTS

| | | | |
|---|---|---|---|
| 3,628,022 | 12/1971 | Schulte, Jr. | 455/609 |
| 4,482,980 | 11/1984 | Korowitz et al. | 455/606 X |
| 4,501,021 | 2/1985 | Weiss | 455/601 |
| 4,730,301 | 3/1988 | McMahon | 455/607 X |
| 4,850,043 | 7/1989 | Winston | 455/607 |

Primary Examiner—Bernarr E. Gregory
Attorney, Agent, or Firm—Gregory A. Cone; John P. Scholl

[57] ABSTRACT

There is provided by this invention a secure fiber optic communication system based on the Sagnac interferometer having features that make the system intrusion resistant. The security of the system is based on placing a random phase modulator at the midpoint of the communications loop that will phase modulate the counterpropagating light beams according to a string of random data to scramble the signal information. The detector for the system is located at the point of origination and recombination of the counterpropagating beams such that the scrambling signal cancels out at the point of detection allowing the intelligence signal to be demodulated without additional electronics. In order for an intruder to intercept the signal, both counterpropagating beams must be accessed at the transmitter which is in a controlled area. Intrusion at any other point in the loop will intercept the light signal which contains part of the scrambled data which is unintelligible.

5 Claims, 1 Drawing Sheet

CW BEAM

CCW BEAM

SECURE COMMUNICATION SYSTEM

BACKGROUND OF THE INVENTION

1. Field of the Invention

This invention relates generally to fiber optic communication systems and, more particularly, to Sagnac interferometer based fiber optic systems that utilize counterpropagating light paths to form a fiber optic communications loop whereby modulation of the counterpropagating beams results in a controlled modulation of the detected output when the counterpropagating beams recombine. This system may be accessed by a multitude of authorized users at predetermined data entry points.

2. Description of the Prior Art

The need for high bandwidth secure communication systems that are amenable to uses in networks and minimize the need for encryption is expected to become increasingly acute in the near future. Long-term trends for very high bandwidth sensors, computers, and multichannel video display capabilities will dictate this type of technology. The advent of fiber optics has opened up a new area where very high speed, low cost telecommunication is possible.

SUMMARY OF THE INVENTION

There is provided by this invention a Sagnac interferometer based secure communication system using a short coherence length source in combination with counterpropagating paths that have inherent self-matching characteristics to make an intrusion resistant telecommunications link. In one of the simplest forms of the Sagnac interferometer based secure communication system, light from a broadband light source such as a light emitting diode is directed into a beamsplitter. One output of the beamsplitter is directed toward a detector. The other outputs of the beamsplitter generate clockwise and counterclockwise light beams that are coupled as counterpropagating light beams in the interferometer loop by the beamsplitter. Data is impressed upon the counterpropagating light beams by modulating their relative phase. When the two beams of light recombine on the beamsplitter, their difference in phase causes the recombined light beam to be modulated. When the combined beams return to the beamsplitter, a portion of this modulated light beam is directed into a detector which converts the light signal into a modulated electrical signal corresponding to the data impressed onto the light beam. The light source, beamsplitter, detector and associated support electronics constitute the receiver for the system. The optical and electrical support elements used to impress the relative phase difference between the counterpropagating light beams is the transmitter for the system.

The security of the system is based on a combination of the information being impressed on the relative phase difference between the counterpropagating light beams and the low coherence length of the light source. In order for an intruder to intercept the signal, both counterpropagating beams must be accessed and the pathlength of the two beams matched to within less than a coherence length of the light source so that the modulated output signal may be constructed. Since the counterpropagating pathlengths may differ by kilometers at the point of interception and the coherence length of a low coherence light source such as light emitting or superradiant diode may be on the order of 30 microns tapping into the system is extremely difficult. Secure communications systems of this type are described in the pending application entitled, "Secure Communication System", Ser. No. 880,684 assigned to the assignee of the instant application to which reference is made to incorporate the teachings thereof.

It is an object of this invention to provide a system that is amendable to uses by multiple users and networking arrangements. It is an object of this invention to send information at high data rates, using phase modulators, tap-resistant single mode fibers, and random phase modulation of the system to prevent unauthorized intrusions. It is an object of this invention to provide flexible secure communication systems that offer adequate security at the lowest possible cost.

BRIEF DESCRIPTION OF THE PREFERRED EMBODIMENT

Figure 1:
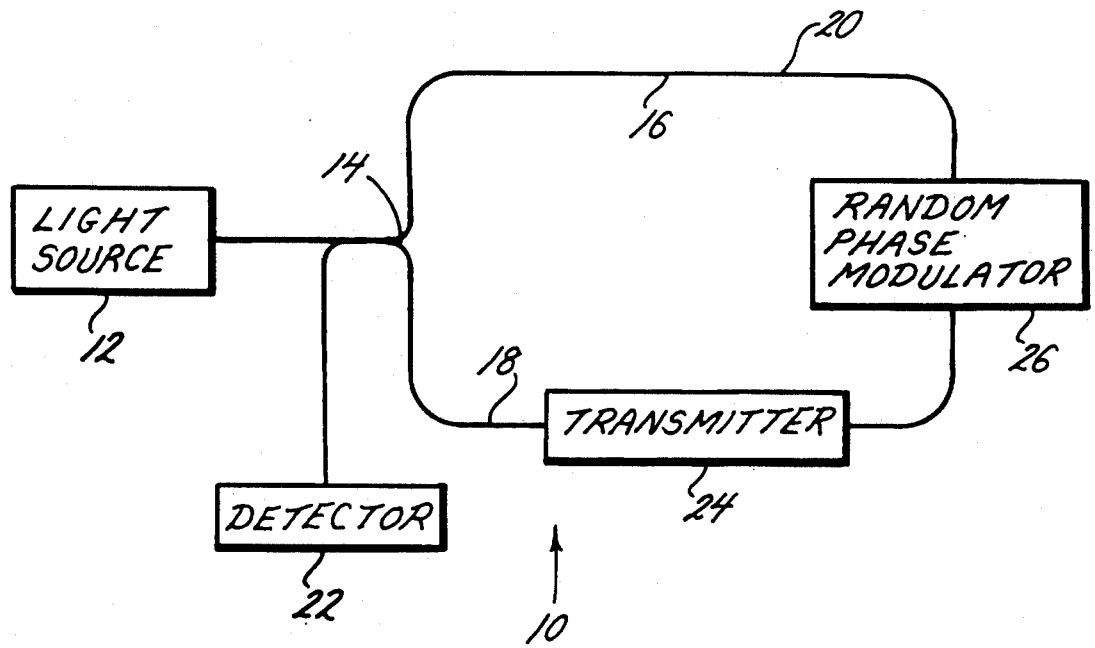
FIG. 1 is a schematical representation of a fiber optic communication system based on the Sagnac interferometer that incorporates the principles of this invention.
Figure 2:
FIG. 2 illustrates the detector output for the clockwise beam of the communication system after scrambling by the random phase modulator.
Figure 3:
FIG. 3 illustrates the detector output for the counterclockwise beam of the communication system after scrambling by the random phase modulator.

A Sagnac interferometer based secure communication system 10 incorporating the principles of this invention is shown in FIG. 1. A light source 12 is used to inject a light beam into the system which is split by the beamsplitter 14 into a clockwise beam 16 and a counterclockwise beam 18. The two light beams travel in counterpropagating directions in the optical fiber loop 20. In the absence of any other devices in the system, the two counterpropagating beams would recombine at the beamsplitter 14 and the combined output of the two beams is detected by the detector 22 which is connected to one output of the beamsplitter 14. Since both beams travel the same path, there is no interference between the two beams at the detector, thus the detector has no time-varying output. Once a transmitter 24 is placed in the system, such as a phase modulator that changes the optical path of the two light beams, an interference pattern develops that is detected by the detector. Electrical circuitry not shown but well known in the art is connected to the detector for demodulating the signal detected at the detector. Thus, controlled modulation by the transmitter 24 may input an intelligence that is transmitted over the optical path 20 to be detected by the detector 22 which is configured as a receiver in the system. As described in the copending application, "Secure Communications System", Ser. No. 880,684, filed Jun. 11, 1986, referenced herein, the Sagnac interferometer as a communications system has inherent characteristics that make it intrusion resistant. However, to further the security characteristics of this system a random phase modulator 26, normally operating at the same frequency as the transmitter 24, is added to randomly shift the phase of the counterpropagating beams. When the transmitter 24 is operating, generating a controlled pulse train of intelligent information, this information may be altered and distorted by the introduction of a second string of random data by the random phase modulator 26. Consequently, the time varying phase information of the light beams guided in the optical fiber loop has been rendered completely random. FIGS. 2 and 3 illustrate how random phase modulation of the clockwise and counterclockwise beams creates data streams that cannot constructively interfere when combined at the beamsplitter 14 to produce the intelligence signal.

The random phase modulator is positioned midway in the optical loop 20 such that the clockwise and counterclockwise beams each travel the same distance to the random phase modulator before scrambling. Since both beams are modulated by the random phase modulator at the same time, when the two beams are recombined at the beamsplitter 14, the random data impressed on the beams cancel out and only the phase modulated intelligence signal of the transmitter 24 remains. Thus, an intruder who taps into the line will only receive a scrambled signal because the intruder's Sagnac scheme cannot place the random phase modulator at the midpoint, resulting in random phase modulations on the beams at different times. Therefore, the intruders Sagnac scheme cannot cancel out the random signal. Other interferometer schemes such as the Mach-Zehnder that may be used by an intruder has an output that is totally distorted by the random phase modulator and the system has no way to separate the real information from the random data stream.

The transmitter and the random phase modulator may be one of several types of modulators well known in the art or may be of the type described in the referenced copending application incorporated herein. The transmitter or signaling means for modulating an intelligence signal on the counterpropagating light beams may be a transducing means deposited directly on the optical fiber loop for oscillation by a driver. The signaling means for modulating an intelligence signal on the counterpropagating light beams may be an optical fiber wrapped around a voltage driven piezoelectric mandril for changing the fiber length as the voltage changes. The signaling means for modulating an intelligence signal on the counterpropagating light beams may also be acousto-optic modulators or electro-optic phase modulators.

It can readily be seen that there is provided by this invention a novel fiber optic communications system based on the principles of the Sagnac interferometer that is intrusion resistant.

Although there has been illustrated and described specific detail and structure of operation, it is clearly understood that the same were merely for purposes of illustration and that changes and modifications may be readily made therein by those skilled in the art without departing from the spirit and scope of this invention.

What is claimed is:

1. A fiber optic communication system, comprising:
   a) a light source means for inputting a beam of light into a first optical fiber;
   b) a beamsplitting means for splitting the light beam into counterpropagating beams connected to the first optical fiber having one output connected to a detector and second and third outputs for generating clockwise and counterclockwise beams respectively;
   c) an optical fiber loop having one end connected to the second output of the beamsplitting means for receiving a light beam propagating in a clockwise direction and the other end of the optical fiber loop connected to the third output of the beamsplitting means for receiving a light beam propagating in a counterclockwise direction;
   d) a signaling means connected to the optical fiber loop for modulating an intelligence signal on the counterpropagating light beams;
   e) a random phase modulating means connected to the optical fiber loop at its midpoint for modulating a random signal on the counterpropagating light beams; and
   e) an electrical circuit means connected to the detector for demodulating the light beams detected to receive the intelligence signal.

2. A fiber optic communication system as recited in claim 1 wherein the signaling means and random modulating means for modulating the counterpropagating light beams are phase modulators.

3. A fiber optic communication system as recited in claim 1 wherein the signaling means and random modulating means for modulating the counterpropagating light beams are transducing means deposited directly on the optical fiber loop for oscillation by a driver.

4. A fiber optic communication system as recited in claim 1 wherein the signaling means and random modulating means for modulating the counterpropagating light beams is an optical fiber wrapped around a voltage driven piezoelectric mandril for changing the fiber length as the voltage changes.

5. A fiber optic communication system as recited in claim 1 wherein the signaling means and random modulating means for modulating the counterpropagating light beams are acousto-optic modulators.

* * * * *